United States Patent
Graf et al.

(10) Patent No.: US 10,976,192 B2
(45) Date of Patent: Apr. 13, 2021

(54) HYDRAULIC SHOCK ABSORBER AND LABORATORY DEVICE

(71) Applicant: SARTORIUS LAB INSTRUMENTS GMBH & CO. KG, Goettingen (DE)

(72) Inventors: Winfried Graf, Niemetal (DE); Malte Staender, Heiligenstadt (DE)

(73) Assignee: SARTORIUS LAB INSTRUMENTS GMBH & CO., KG, Goettingen (DE)

(*) Notice: Subject to any disclaimer, the term of this patent is extended or adjusted under 35 U.S.C. 154(b) by 205 days.

(21) Appl. No.: 16/366,272

(22) Filed: Mar. 27, 2019

(65) Prior Publication Data
US 2019/0219440 A1    Jul. 18, 2019

Related U.S. Application Data

(63) Continuation of application No. PCT/EP2017/000849, filed on Jul. 14, 2017.

(30) Foreign Application Priority Data

Sep. 27, 2016  (DE) .......................... 102016118184.6

(51) Int. Cl.
*A47B 9/00* (2006.01)
*F15B 15/14* (2006.01)
(Continued)

(52) U.S. Cl.
CPC .............. *G01G 23/002* (2013.01); *A47B 9/04* (2013.01); *F16F 9/14* (2013.01); *F16F 9/182* (2013.01);
(Continued)

(58) Field of Classification Search
CPC ......... F16F 9/14; F16F 9/182; F15B 15/1466; F15B 15/149; G01G 23/002;
(Continued)

(56) References Cited

U.S. PATENT DOCUMENTS 2,836,843 A * 6/1958 Gallagher, Jr. .......... F16M 7/00
                                                    16/44
3,175,795 A * 3/1965 Adams ................. A47B 91/024
                                                    248/188.4
(Continued)

FOREIGN PATENT DOCUMENTS

DE          518141 C    2/1931
EP       0831245 A2    3/1998
(Continued)

OTHER PUBLICATIONS

Computer translation of DE 518,141 (Avery) downloaded Dec. 14, 2020.*
(Continued)

*Primary Examiner* — Randy W Gibson
(74) *Attorney, Agent, or Firm* — Edell, Shapiro & Finnan, LLC

(57) ABSTRACT

A positioning foot having a hydraulic shock absorber with a fluid-filled hollow cylinder (210), in which a piston (220) that moves axially between an advanced, spring prestressed position and a retracted position. The piston separates a front axial fluid space (214) and a rear axial fluid space (215) from one another in the hollow cylinder. Both fluid spaces are connected to one another in a fluid exchanging fashion via at least one throttle opening (223) in the piston. The piston is rigidly connected to a piston rod (221), which passes through the front fluid space and abuts a fixed stop (218) in the retracted position, in which the volume of the rear axial fluid space is minimized and the volume of the front axial fluid space is maximized. The spring prestress is dimensioned so that the weight of the device body moves the piston dampingly into the retracted position.

6 Claims, 3 Drawing Sheets

(51) Int. Cl.
*F16F 9/18* (2006.01)
*F16M 7/00* (2006.01)
*F16M 11/24* (2006.01)
*G01G 21/28* (2006.01)
*G01G 23/08* (2006.01)
*G01G 23/00* (2006.01)
*A47B 9/04* (2006.01)
*F16F 9/14* (2006.01)
*A47B 91/02* (2006.01)

(52) U.S. Cl.
CPC ............. *F16M 11/24* (2013.01); *G01G 21/28* (2013.01); *G01G 23/005* (2013.01); *G01G 23/08* (2013.01); *A47B 91/024* (2013.01); *F15B 15/1466* (2013.01); *F16M 7/00* (2013.01)

(58) Field of Classification Search
CPC ...... G01G 23/005; G01G 23/08; G01G 21/28; F16M 7/00; F16M 11/00; F16M 11/24; A47B 9/04; A47B 91/024
See application file for complete search history.

(56) References Cited

U.S. PATENT DOCUMENTS

| | | | | |
|---|---|---|---|---|
| 3,982,738 | A | 9/1976 | Meier et al. | |
| 4,418,774 | A | 12/1983 | Whitney et al. | |
| 4,798,359 | A * | 1/1989 | Ball | A47B 91/16 248/188.3 |
| 4,848,495 | A * | 7/1989 | Hayashi | G01G 23/08 177/187 |
| 5,332,182 | A * | 7/1994 | Weisz | F16M 7/00 248/188.4 |
| 7,232,963 | B2 * | 6/2007 | Leisinger | G01G 21/283 177/238 |
| 7,314,206 | B2 * | 1/2008 | Lee | D06F 37/20 248/188.3 |
| 7,597,295 | B2 * | 10/2009 | Neibert | F16M 7/00 248/188.3 |
| 7,673,845 | B2 * | 3/2010 | Dam | D06F 39/125 248/615 |
| 7,717,380 | B2 * | 5/2010 | Kwon | D06F 39/125 248/188.3 |
| 10,619,693 | B2 * | 4/2020 | Knol | F16F 9/182 |
| 10,677,640 | B2 * | 6/2020 | Dehner | G01G 23/002 |
| 10,745,850 | B2 * | 8/2020 | Zhao | D06F 39/125 |
| 2002/0084390 | A1 * | 7/2002 | Parisi | A47B 91/024 248/188.8 |
| 2007/0262213 | A1 * | 11/2007 | de Toledo | A47L 15/4253 248/188.8 |
| 2007/0267561 | A1 * | 11/2007 | Dam | A47B 91/024 248/615 |
| 2009/0212193 | A1 * | 8/2009 | Neibert | A47B 91/16 248/615 |
| 2011/0114817 | A1 * | 5/2011 | Nakata | G02B 21/0012 248/615 |
| 2012/0031684 | A1 * | 2/2012 | Schon | G01G 21/28 177/25.12 |
| 2012/0097828 | A1 * | 4/2012 | Burns | F16M 7/00 248/636 |
| 2015/0007756 | A1 * | 1/2015 | Kollreider | A47B 9/20 108/21 |
| 2015/0176674 | A1 * | 6/2015 | Khan | F16M 7/00 403/120 |
| 2017/0074719 | A1 * | 3/2017 | Izumo | G01G 23/00 |
| 2017/0258228 | A1 * | 9/2017 | Kato | A47B 13/023 |
| 2018/0003257 | A1 * | 1/2018 | Knol | F16F 9/182 |
| 2018/0252573 | A1 * | 9/2018 | Dehner | G01G 23/002 |
| 2018/0355546 | A1 * | 12/2018 | Zhao | F16M 7/00 |
| 2019/0025860 | A1 * | 1/2019 | Kollreider | G05D 19/02 |
| 2019/0142160 | A1 * | 5/2019 | Hognaland | A47B 91/16 248/188.2 |
| 2020/0347540 | A1 * | 11/2020 | Zhao | F16M 7/00 |

FOREIGN PATENT DOCUMENTS

| | | |
|---|---|---|
| EP | 2652468 B1 | 8/2016 |
| JP | 2006189267 A | 7/2006 |

OTHER PUBLICATIONS

International Search Report, PCT/EP2017/000849, dated Sep. 11, 2017, 4 pages.
International Preliminry Report, PCT/EP2017/000849, dated Jun. 8, 2018, 6 pages.

* cited by examiner

HYDRAULIC SHOCK ABSORBER AND LABORATORY DEVICE

CROSS REFERENCE TO RELATED APPLICATIONS

This is a Continuation of International Application PCT/EP2017/000849, which has an international filing date of Jul. 14, 2017, and which claims the priority of German Patent Application 10 2016 118 184.6, filed Sep. 27, 2016. The disclosures of both applications are incorporated in their respective entireties into the present Continuation by reference.

FIELD OF THE INVENTION

The invention relates to a laboratory device, in particular, a measuring apparatus, such as, for example, a weighing apparatus, with a device body that can be installed on a plurality of positioning feet, which are attached to said device body, on a base surface.

BACKGROUND

Known from EP 2 652 468 B1 is a spectroscope comprising a device body that rests on vibration-insulating positioning feet. Each positioning foot comprises an elastomeric body having a lower portion that is surrounded by a rigid shell in two sections. While in the upper portion the rigid shell and the elastomeric body are firmly connected to each other, in the lower portion a fluid-filled annular space is formed between the elastomeric body and the rigid shell. The annular space is connected to a central cavity of the elastomeric body. Vibrations of a base, on which the spectrometer is placed with its positioning feet, are damped, in particular, in the lateral direction by the flow resistance when the fluid is exchanged between the central cavity and the annular space. In the vertical direction the device body is elastically supported by the upper portion of the elastomeric body.

Although vibration-insulating positioning feet of this kind can be used for a variety of precision instruments, their use as positioning feet for precision balances is disadvantageous. The resolution of precision balances goes far beyond what such passive vibration insulators are capable of achieving. The permanently elastic mounting results in the apparatus being susceptible to vibration, an aspect that interferes with a precise weighing result. Therefore, precision balances usually have stiff positioning feet, with which their device body is rigidly placed on a heavy foundation, the so-called weighing stone. The vibration insulation is achieved either by the sheer mass of the weighing stone or by extremely complex, active vibration-insulating apparatuses in the weighing stone or in its foundation.

The U.S. Pat. No. 3,982,738 A shows a balance comprising a transmission lever, on which a vibration damper acts for the purpose of transport safety. Furthermore, the balance has a spring-loaded device foot.

The U.S. Pat. No. 4,418,774 A shows a balance that works according to the principle of the vibrating string. This balance has vibration dampers to reduce the influence of externally induced vibrations.

Modern precision balances can be made relatively small. That means that it is possible to create, in principle, mobile devices that can be repositioned, as needed. Nevertheless, such devices weigh several kilograms, so that their repositioning requires a significant amount of muscle power, an aspect that renders the delicate handling of such devices difficult or even impossible. On the other hand, the device body of such precision balances contains highly sensitive elements that can be maladjusted or even damaged by excessive accelerations, such as those encountered during rough installation on a firm support. As a result, there are conflicting goals between a shock absorption for reducing the vibration during setup, on the one hand, and a non-elastic mounting during operation, on the other hand. As explained above, these conflicting goals cannot be bridged by the known, elastomeric positioning feet. Another problem is the requirement that each precision balance has to be leveled with a high degree of precision before said precision balance is put into operation, so that its weighing mechanism is aligned with a high degree of accuracy, usually exactly horizontally, in its predetermined desired position. This aspect requires a height adjustability of at least one of its positioning feet.

The aforementioned explanations apply not only to precision balances, but also to several types of laboratory devices, such as, for example, measuring instruments, centrifuges, automatic pipetting machines, etc. Therefore, the specific explanation was made only in the context of precision balances, because the problems described are particularly evident with respect to precision balances. However, the invention, described in the present specification, relates to any type of laboratory equipment; and the advantages to be obtained will become more or less clear as a function of the specific application.

So-called industrial shock absorbers, as described, for example, in the published document EP 0 831 245 A2, are known from a completely different field of technology. In this case these industrial shock absorbers are hydraulic shock absorbers with a fluid-filled hollow cylinder, in which a piston that can be moved axially between an advanced position, which is supported by a spring prestress, and a retracted position, which can be assumed counter to the spring prestress, is arranged; said piston separates a front axial fluid space and a rear axial fluid space from one another in the hollow cylinder, with both fluid spaces being connected to one another in a fluid exchanging fashion with at least one throttle opening in the piston, wherein the piston is rigidly connected to a piston rod, which passes through the front fluid space, and abuts a fixed stop in its retracted position, in which the volume of the rear axial fluid space is minimized and the volume of the front axial fluid space is maximized.

Such industrial shock absorbers are often used in places, where masses are transported on conveyor belts or roller conveyors and have to be decelerated in more or less the exact position. In this case the shock absorber in question is mounted on a rigid frame and protrudes in anti-parallel alignment with the direction of motion of the masses into their transport path. The approaching mass makes contact with the end of the piston rod that projects beyond the hollow cylinder; and said approaching mass transmits its kinetic energy to said piston rod. Then the piston moves out of its advanced position into its retracted position, as a result of which, the damper fluid flows out of the rear axial fluid space with or through the throttle openings in the piston into the front axial fluid space, a feature that is associated with a gradual damping of the piston speed as far as up to the immobilization of the piston as a result of the flow friction. The design of such an industrial shock absorber is always carried out in view of the masses to be decelerated and their velocity.

SUMMARY

An object of the present invention is to further develop an apparatus conforming to its genre in such a way that the conflicting goals, explained above, between sufficient shock absorption during setup and non-elastic mounting during operation of the precision balance are bridged.

According to one formulation of the invention, this object is achieved with an industrial shock absorber known per se but configured as a positioning foot that is arranged in a vertically adjustable manner on the device body of the laboratory device, wherein the spring prestress is dimensioned in such a way that the weight of the device body, which exerts a load when the laboratory device is installed on the positioning foot, is sufficient to move the piston into its retracted position in a damped manner.

Thus, the result is a laboratory device characterized in that at least one positioning foot comprises a fluid-filled hollow cylinder, in which a piston that can be moved axially between an advanced position, which is supported with a spring prestress, and a retracted position, which can be assumed counter to the spring prestress, is arranged. The piston separates a front axial fluid space and a rear axial fluid space from one another in the hollow cylinder, with both fluid spaces being connected to one another in a fluid exchanging fashion through at least one throttle opening in the piston. The piston is rigidly connected to a piston rod, which passes through the front fluid space, and abuts a fixed stop in its retracted position, in which the volume of the rear axial fluid space is minimized and the volume of the front axial fluid space is maximized. The spring prestress is dimensioned in such a way that the weight of the device body, which exerts a load when the laboratory device is installed on the positioning foot, is sufficient to move the piston into its retracted position in a damped manner.

Preferred embodiments of the invention are the subject matter of the dependent patent claims.

According to a further formulation, the present invention proposes providing an industrial shock absorber as a positioning foot of a laboratory device, in particular, a weighing apparatus, in particular, a shock sensitive precision balance. In this case the industrial shock absorber is designed differently than would be the case in its actual, intended use, in order to fulfill the objective as a positioning foot with respect to the mass of the laboratory device. Unlike the design for the intended use of said shock absorber, the design in accordance with the present invention is carried out, in particular, in such a way that the piston is transferred into its (maximum) retracted position and is moved against its fixed stop. This feature is positively avoided in the typical design of an industrial shock absorber. The fact that the said industrial shock absorbers are of such a nature that they can be used at all according to the invention at variance with their intended purpose is absolutely surprising, since the profile of the loading of said industrial shock absorbers as a function of time when used according to the present invention is much different than when they are used in accordance with their intended use. When used as intended, the force, which acts on the piston and which is fed solely from the kinetic energy of the mass to be decelerated, decreases continuously and disappears completely towards the end of the process. On the other hand, when said industrial shock absorbers are used according to the present invention, the kinetic energy, i.e., essentially the speed, at which the laboratory device is placed on a base surface, plays a minor role, only with reasonable handling. In this case the force, acting on the shock absorber/positioning foot, is fed from the gravitational, potential energy and consequently from the weight of the device body. At the end of the process, said device body will continue to exert a load permanently on the shock absorber/positioning foot. Nevertheless, experiments have shown that it is certainly possible to bridge the aforementioned conflicting goals through the use of the present invention.

In order to achieve an exact alignment of the laboratory device, the arrangement of the shock absorber/positioning foot on the device body is carried out in a manner allowing vertical adjustment. For this purpose, it is provided in a preferred embodiment that the hollow cylinder (of at least one shock absorber/positioning foot) comprises an external thread, which is screwed into a corresponding internal thread on the device body, as well as a rotating actuating element that is rigidly connected to said hollow cylinder. For example, a standard knurled wheel may be used as a rotating actuating element. With the aid of the knurled wheel the entire shock absorber/positioning foot can be rotated manually relative to the internal thread on the device body, so that the vertical position of the hollow cylinder and, thus, in particular, the position of the fixed stop can also be varied vertically. As an alternative, a motorized vertical adjustment can be achieved. For example, it may be provided that the hollow cylinder comprises an external thread, which is screwed into a corresponding internal thread on the device body, wherein the internal thread is mounted on the device body in a manner that allows rotational motion; and said internal thread is provided with a motorized rotational drive.

It is easily possible to replace all of the positioning feet of a laboratory device, typically three or four, with an industrial shock absorber, as described. However, such an arrangement is comparatively expensive. It has already proven helpful to use only one shock absorber/positioning foot (or a few shock absorbers/positioning feet), in addition to one or more conventional positioning feet. Then said shock absorber/positioning foot has to protrude with its piston rod beyond the conventional shock absorber/positioning foot or the conventional shock absorbers/positioning feet; and, when the laboratory device is installed, said shock absorber/positioning foot already largely decelerates the device body of said laboratory device before the conventional positioning feet come into contact with the base surface.

In order to achieve a quasi asymptotic deceleration of the device body, it is possible for the piston (of the shock absorber/positioning foot) in a particularly advantageous embodiment of the invention to have in its side wall a plurality of throttle openings, which connect the axial fluid spaces and of which the further the piston is moved out of its advanced position into the direction of its retracted position, the more are closed by an inner wall projection of the hollow cylinder, with said inner wall projection resting against the piston side wall. In particular, an essentially cup-shaped configuration of the piston, the cup opening of which is turned to the rear axial fluid space, is suitable for this purpose. This arrangement of a plurality of throttle openings means that with increasing retraction of the piston fewer and fewer channels are available, through which the damper fluid can flow from the rear into the front axial fluid space. Thus, the damping effect increases with increasing retraction of the shock absorber/positioning foot. The result is that the piston approaches its stop in a particularly gentle fashion.

Other features and advantages of the invention will become apparent from the following specific description and the drawings.

DETAILED DESCRIPTION

Figure 1:
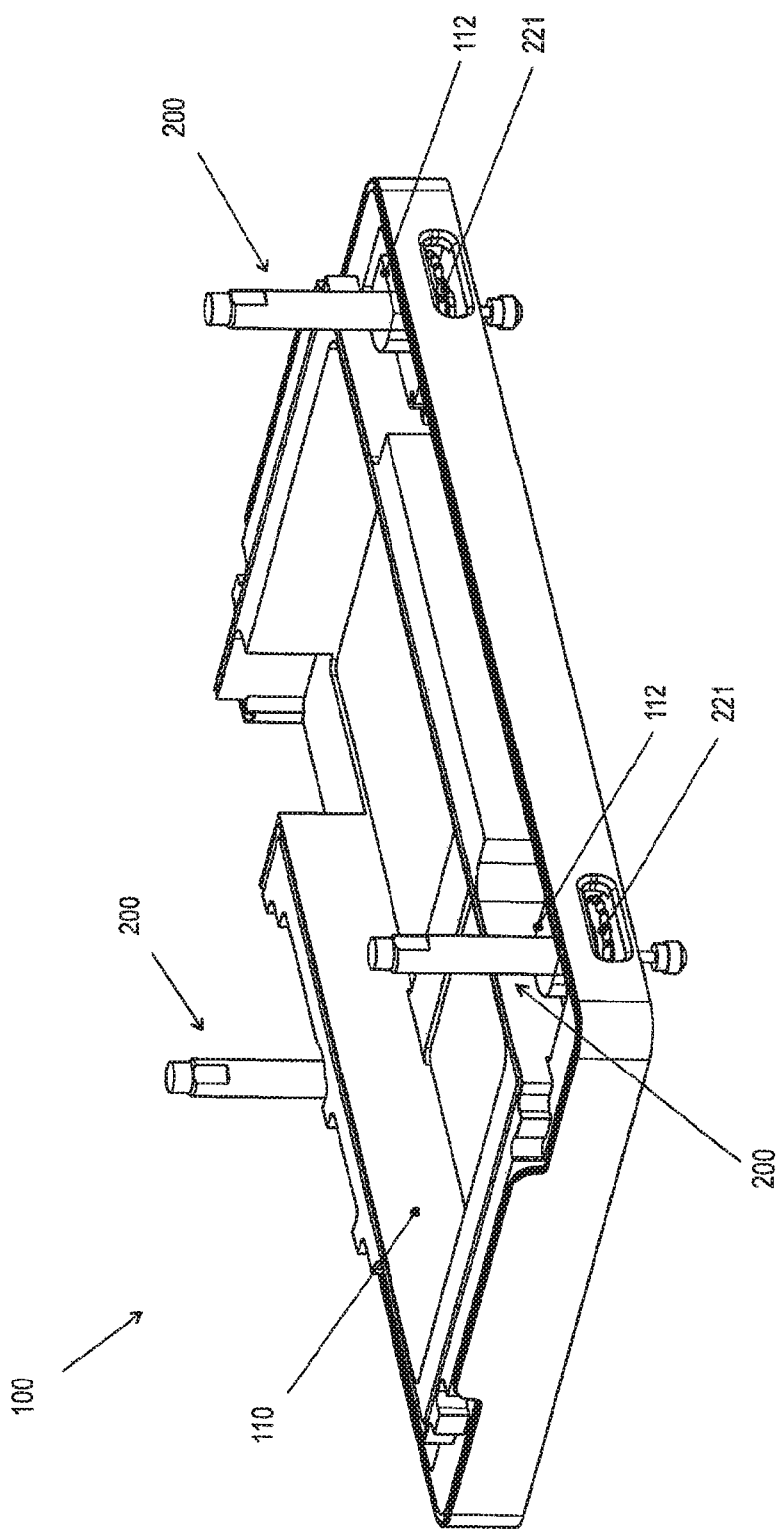
FIG. 1: the bottom plate of the device body of a laboratory device with three positioning feet in accordance with the present invention.

Identical reference numerals in the figures indicate the same or analogous elements.

FIG. 1 shows a perspective view of the bottom plate 110 of a laboratory device 100, which, moreover, is not shown in greater detail. Said laboratory device comprises three positioning feet 200, which are implemented, according to the invention, in the form of industrial shock absorbers that are reallocated for a different purpose. For a more detailed description of the positioning feet 200, reference is made to FIGS. 2 to 5.

Figure 3:
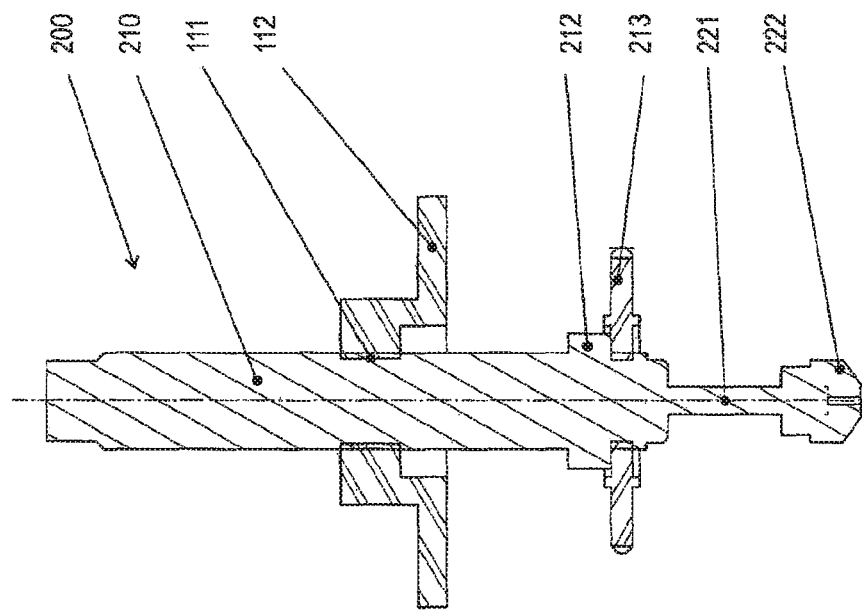
FIG. 3: a partially hidden sectional view of the positioning foot from FIG. 2.
Figure 2:
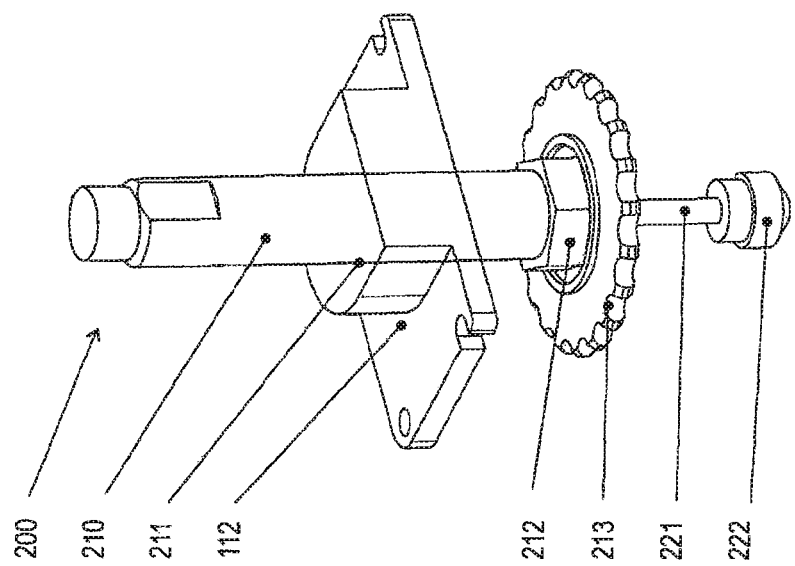
FIG. 2: a perspective view of a single positioning foot.

FIGS. 2 and 3 show a perspective or alternatively a partially hidden sectional view of a positioning foot 200, which is screwed with the external thread 211 of its hollow cylinder 210 into an internal thread 111 of a support plate 112, which is rigidly connected to the bottom plate 110. The "special features" of the hollow cylinder 210 will be described below in the context of FIGS. 4 and 5.

A piston rod 221 protrudes downwards from the hollow cylinder 210; and a head 222, which is pointed in the manner of a truncated cone, is arranged on the distal end of said piston rod. The piston rod 221 can be moved axially relative to the hollow cylinder 210 that is screwed into the support plate 112. A knurled wheel 213 is fixed to the external thread 211 of the hollow cylinder 210 with a lock nut 212, so that the hollow cylinder 210 can be rotated by manual rotation of the knurled wheel 213; and, thus, the positioning foot 200 can be vertically adjusted, on the whole, with respect to the bottom plate 110.

Figure 4:
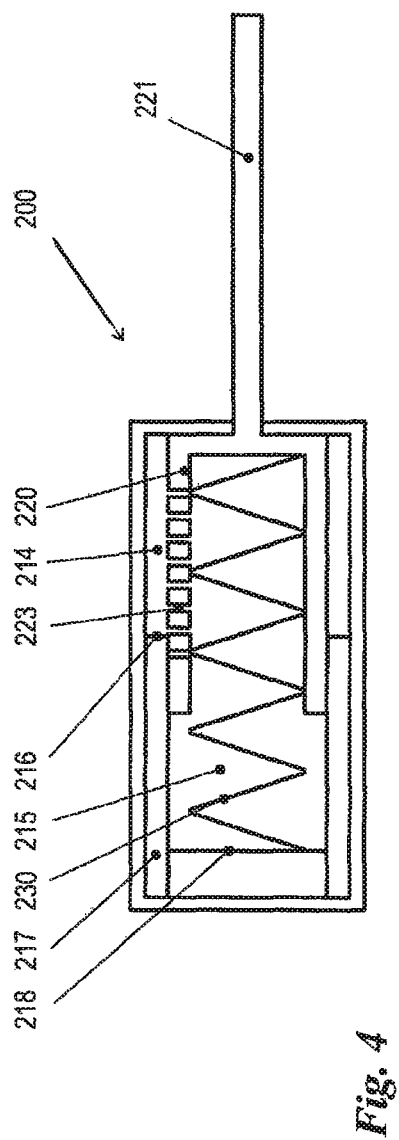
FIG. 4: a schematic representation of a shock absorber, used in accordance with the invention, in its advanced position.
Figure 5:
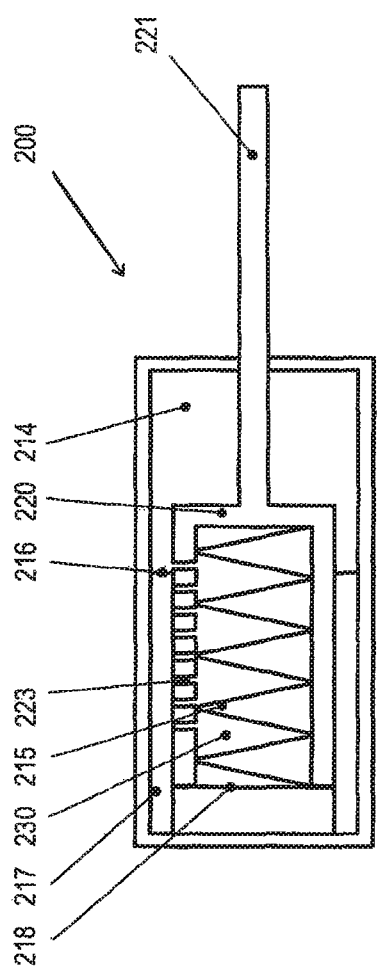
FIG. 5: the shock absorber from FIG. 4 in its retracted position.

FIGS. 4 and 5 show an industrial shock absorber, which is used, according to the invention, as a positioning foot 200, in an oversimplified schematic representation. A cup-shaped piston 220 is arranged in the hollow cylinder 210 in such a way that it is axially displaceable. The piston 220 is permanently connected to the piston rod 221, which passes through the front end face of the hollow cylinder 210 in a sealing manner. The seal may be arranged in the passage of the piston rod 222 through the front end face of the hollow cylinder 210. However, other sealing measures are also conceivable, such as, for example, the arrangement of a sealing rolling diaphragm or the like.

The piston 220 is prestressed with a prestress spring 230 in its advanced position shown in FIG. 4. Said piston divides the interior of the hollow cylinder 210 into a front axial fluid space 214 and a rear axial fluid space 215. In FIG. 4, the front axial fluid space 214 is minimized in size, whereas the rear axial fluid space 215 is maximized in size. In FIG. 5, these ratios are reversed. The fluid spaces 214, 215 are connected to each other via breakthroughs 223 in the side wall of the piston 220.

Starting from the non-loaded advanced position shown in FIG. 4, a shock absorber, which is used as a positioning foot 200, is subjected to an axially directed force on the piston rod 221 of said shock absorber when the laboratory device of the present invention is placed on a base plate. This results in a displacement of the piston 220 counter to the spring prestress of the spring 230, so that the damping fluid, with which the cavity of the hollow cylinder 210 is filled, flows from the rear axial fluid space 215 through the throttle openings 223 into the front axial fluid space 214. As a result of the fluid flow friction, the axial movement of the piston 220 is damped.

During the immersion of the piston 220, the throttle openings 223 pass successively a shoulder 216 of an annular projection 217 in the interior of the hollow cylinder 210 and in this way are sealed one after the other in succession. Therefore, the total amount of the flow path that is available between the two axial fluid spaces 214, 215 decreases with the immersion of the piston 220, so that the resulting damping increases. The piston 220 comes to a standstill at the rear stop 218 in its retracted position shown in FIG. 5.

In the inventive design of the positioning foot 200 the intrinsic weight of the laboratory device 100, which exerts a load on the positioning foot 200, is sufficient to transfer the piston 220 from its advanced position (FIG. 4) into its retracted position (FIG. 5) or, more specifically, upon transfer, to hold said piston in its retracted position counter to the spring force of the spring 230. Thus, the result is that the laboratory device is always installed gently, so that deleterious accelerations on delicate elements of the laboratory device are avoided, but at the same time it is achieved that the mounted laboratory device stands on its base without elastic, vibration-susceptible intermediate elements.

The embodiments that are discussed in the specific description and shown in the figures represent exemplary embodiments of the present invention that are shown only for illustrative purposes. The person skilled in the art in question is given in light of the disclosure herein a wide range of possible variations.

LIST OF REFERENCE NUMERALS 100 laboratory device
110 lower shell of 100
111 internal thread of 112
112 support plate of 110
200 positioning foot
210 hollow cylinder
211 external thread of 210
212 lock nut
213 knurled wheel
214 front axial fluid space
215 rear axial fluid space
216 shoulder of 217
217 annular projection
218 end stop
220 piston
221 piston rod
222 head of 221
223 throttle opening
230 return spring

What is claimed is:
1. Laboratory device comprising:
a device body installed on a plurality of positioning feet attached to the device body,
wherein at least one of the positioning feet comprises a fluid-filled hollow cylinder, in which a piston is con- figured to move axially between an advanced position supported with a spring prestress, and a retracted position counter to the spring prestress, wherein the piston separates a front axial fluid space and a rear axial fluid space from one another in the hollow cylinder, wherein both fluid spaces are connected to one another in a fluid exchanging fashion via a plurality of throttle openings in the piston, wherein the piston is rigidly connected to a piston rod, which passes through the front fluid space, and abuts a fixed stop in the retracted position, in which the volume of the rear axial fluid space is minimized and the volume of the front axial fluid space is maximized, wherein the spring prestress is dimensioned such that the weight of the device body, which exerts a load when the laboratory device is installed on the positioning foot, is sufficient to move the piston into the retracted position in a damped manner and wherein the throttle openings are arranged in the piston to be sealed in succession by an inner wall of the hollow cylinder as the piston moves axially from the advanced position to the retracted position.

2. Laboratory device, as claimed in claim 1, wherein the at least one positioning foot is configured as a hydraulic shock absorber arranged vertically adjustably on the device body of the laboratory device.

3. Laboratory device, as claimed in claim 1, wherein the hollow cylinder comprises an external thread, which is screwed into a corresponding internal thread on the device body, as well as a rotating actuating element that is rigidly connected to the hollow cylinder.

4. Laboratory device, as claimed in claim 1, wherein the hollow cylinder comprises an external thread, which is screwed into a corresponding internal thread on the device body, wherein the internal thread is mounted on the device body to allow rotational motion, and further comprising a motorized rotational drive.

5. Laboratory device, comprising:

a device body installed on a plurality of positioning feet attached to the device body, wherein at least one of the positioning feet comprises a fluid-filled hollow cylinder, in which a piston is configured to move axially between an advanced position supported with a spring prestress, and a retracted position counter to the spring prestress, wherein the piston separates a front axial fluid space and a rear axial fluid space from one another in the hollow cylinder, wherein both fluid spaces are connected to one another in a fluid exchanging fashion via at least one throttle opening in the piston, wherein the piston is rigidly connected to a piston rod, which passes through the front fluid space, and abuts a fixed stop in the retracted position, in which the volume of the rear axial fluid space is minimized and the volume of the front axial fluid space is maximized, wherein the spring prestress is dimensioned such that the weight of the device body, which exerts a load when the laboratory device is installed on the positioning foot, is sufficient to move the piston into the retracted position in a damped manner wherein the piston comprises in the piston side wall a plurality of throttle openings, which connect the axial fluid spaces, and of which the further the piston is moved out of the advanced position in the direction of the retracted position, the more are closed by an inner wall projection of the hollow cylinder, and wherein the inner wall projection rests against the piston side wall.

6. Laboratory device, as claimed in claim 1, wherein a plurality of the positioning feet are attached to the device body.

* * * * *